US012689418B2

(12) United States Patent
Li et al.

(10) Patent No.: US 12,689,418 B2
(45) Date of Patent: Jul. 21, 2026

(54) UE AIDED ANTENNA CALIBRATION FOR NR-OPTIMAL PORT TO ANTENNA MAPPING

(71) Applicant: Telefonaktiebolaget LM Ericsson (publ), Stockholm (SE)

(72) Inventors: Shaohua Li, Kanata (CA); Jianguo Long, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 625 days.

(21) Appl. No.: 18/022,540

(22) PCT Filed: Aug. 24, 2020

(86) PCT No.: PCT/IB2020/057911
§ 371 (c)(1),
(2) Date: Feb. 22, 2023

(87) PCT Pub. No.: WO2022/043729
PCT Pub. Date: Mar. 3, 2022

(65) Prior Publication Data
US 2023/0412247 A1      Dec. 21, 2023

(51) Int. Cl.
*H04B 7/0456* (2017.01)
*H04B 7/06* (2006.01)
*H04B 7/10* (2017.01)

(52) U.S. Cl.
CPC ......... *H04B 7/0478* (2013.01); *H04B 7/0639* (2013.01); *H04B 7/10* (2013.01)

(58) Field of Classification Search
CPC ............................ H04B 7/0478; H04B 7/0639
See application file for complete search history.

(56) References Cited

U.S. PATENT DOCUMENTS 8,295,869 B2    10/2012  Karlsson et al.
2008/0260058 A1*  10/2008  Li ........................ H04B 7/0654
                                                        375/260

(Continued)

OTHER PUBLICATIONS

Author Unknown, "Technical Specification Group Radio Access Network; Evolved Universal Terrestrial Radio Access (E-UTRA); Physical channels and modulation (Release 16)," Technical Specification 36.211, Version 16.2.0, Jun. 2020, 3GPP Organizational Partners, 248 pages.

(Continued)

*Primary Examiner* — Ayodeji O Ayotunde
(74) *Attorney, Agent, or Firm* — Sonoda & Kobayashi Intellectual Property Law; Sarvajit S. Patil

(57) ABSTRACT

Embodiments of the present disclosure provide methods, apparatuses, and computer products for a base station. A method includes retrieving a plurality of phase rotations associated with a codebook for precoding matrix indicator, PMI, feedback; transmitting, to a User Equipment, UE, a plurality of Channel State Information Reference Signals, CSI-RSs, on a plurality of beams that correspond to the plurality of phase rotations; receiving, from the UE, a plurality of PMIs associated with the plurality of CSI-RSs, respectively, wherein the plurality of PMIs are indicative of a plurality of quantized precoding matrices from the codebook; using the plurality of quantized precoding matrices and the plurality of phase rotations to estimate phase and/or delay errors for a plurality of transmit antenna branches of the base station.

5 Claims, 12 Drawing Sheets

(56)          References Cited

U.S. PATENT DOCUMENTS

| | | | |
|---|---|---|---|
| 2011/0135020 A1 | 6/2011 | Au-Yeung et al. | |
| 2011/0274188 A1 | 11/2011 | Sayana et al. | |
| 2013/0051321 A1* | 2/2013 | Barbieri | H04L 1/0029 |
| | | | 370/328 |
| 2019/0149250 A1 | 5/2019 | Jidhage et al. | |
| 2020/0235792 A1* | 7/2020 | Yang | H04B 7/0478 |

OTHER PUBLICATIONS

Author Unknown, "Technical Specification Group Radio Access Network; Evolved Universal Terrestrial Radio Access (E-UTRA); Physical layer procedures (Release 16), " Technical Specification 36.213, Version 16.2.0, Jun. 2020, 3GPP Organizational Partners, 576 pages.

Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.1.1, Jul. 2020, 3GPP Organizational Partners, 1,078 pages.

Author Unknown, "Technical Specification Group Radio Access Network; NR; Physical channels and modulation (Release 16)," Technical Specification 38.211, Version 16.2.0, Jun. 2020, 3GPP Organizational Partners, 131 pages.

Author Unknown, "Technical Specification Group Radio Access Network; NR; Physical layer procedures for data (Release 15)," Technical Specification 38.214, Version 15.4.0, Dec. 2018, 3GPP Organizational Partners, 102 pages.

Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.

Invitation to Pay Additional Fees and Partial Search for International Patent Application No. PCT/IB2020/057911, mailed May 27, 2021, 20 pages.

International Search Report and Written Opinion for International Patent Application No. PCT/IB2020/057911, mailed Jul. 19, 2021, 25 pages.

* cited by examiner

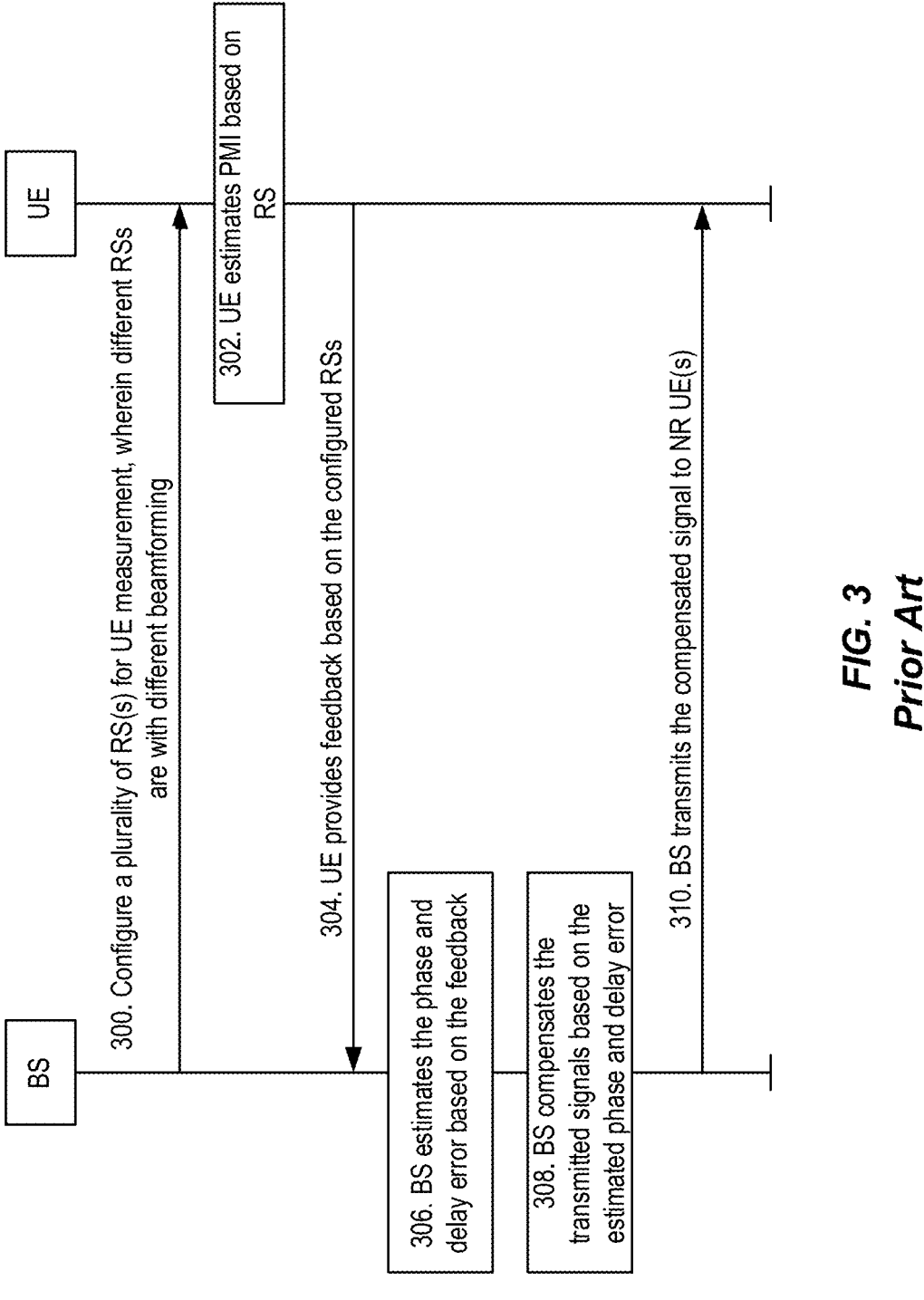

300. Configure a plurality of RS(s) for UE measurement, wherein different RSs are with different beamforming 302. UE estimates PMI based on RS 304. UE provides feedback based on the configured RSs 306. BS estimates the phase and delay error based on the feedback 308. BS compensates the transmitted signals based on the estimated phase and delay error 310. BS transmits the compensated signal to NR UE(s)

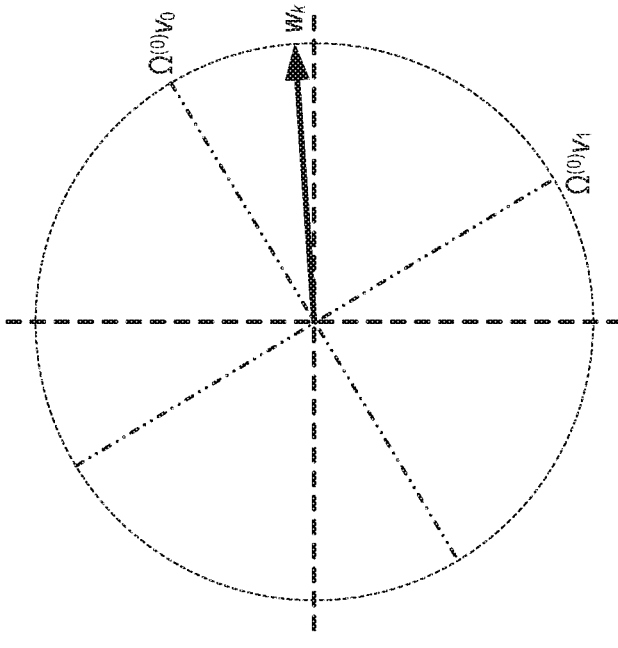
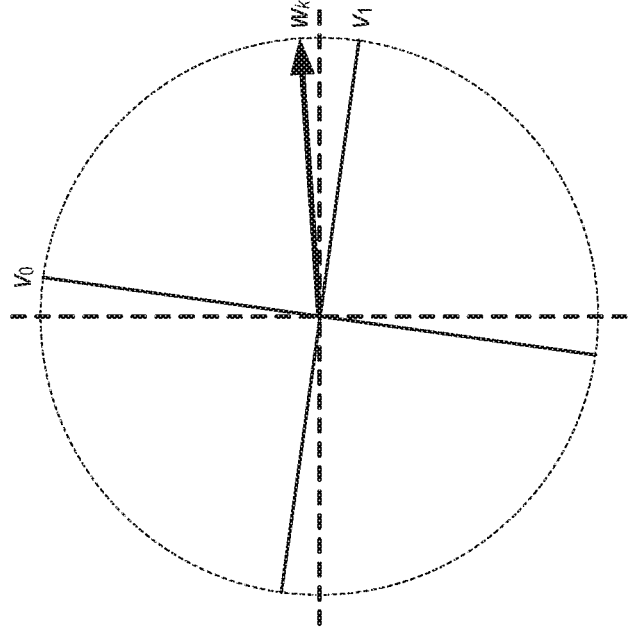
FIG. 6

Generating a first rotation matrix ($\Theta^{(k)}$) based on a first codebook set ($\mathbb{C}_k$) having first elements
900

Generating a second codebook set ($\Theta^{(k)}\mathbb{C}_k$) having second elements by applying the first rotation matrix ($\Theta^{(k)}$) to the first codebook set ($\mathbb{C}_k$), wherein a minimum distance between the first elements ($\forall w_0 \in \mathbb{C}_k$) and the second elements ($\forall w_1 \in \Omega^{(k)}\mathbb{C}_k$) is maximized
902

Generating a third codebook set $\mathbb{C}_{k+1}$ having third elements by concatenating the first elements with the second elements
904

Generating a second rotation matrix ($\Theta^{(k+1)}$) based on the third codebook set($\mathbb{C}_{k+1}$) having third elements
906

Generating a fourth codebook set ($\Theta^{(k+1)}\mathbb{C}_{k+1}$) having fourth elements by applying the second rotation matrix ($\Theta^{(k+1)}$) to the third codebook set ($\mathbb{C}_{k+1}$), wherein a minimum distance between the third elements and fourth elements is maximized
908

Deriving rotation matrices $\Omega$ based on the first rotation matrix ($\Theta^{(k)}$) and the second rotation matrix ($\Theta^{(k+1)}$)
910

*FIG. 9*

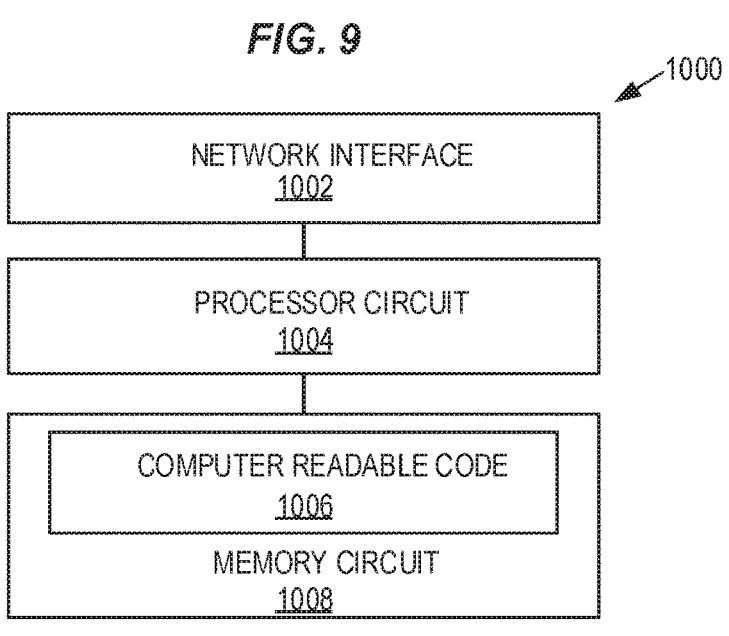

NETWORK INTERFACE
1002

PROCESSOR CIRCUIT
1004

COMPUTER READABLE CODE
1006

MEMORY CIRCUIT
1008

UE AIDED ANTENNA CALIBRATION FOR NR-OPTIMAL PORT TO ANTENNA MAPPING

This application is a 35 U.S.C. § 371 national phase filing of International Application No. PCT/IB2020/057911, filed Aug. 24, 2020, the disclosure of which is incorporated herein by reference in its entirety.

TECHNICAL FIELD

The non-limiting example embodiments of the present disclosure generally relate to a technical field of wireless communication and specifically to methods, apparatuses, and computer products for antenna calibration.

BACKGROUND

Antenna phase alignment has a great effect on system performance. FIG. 1 is a diagram depicting a first antenna 100, a second antenna 101, a third antenna 102, and a fourth antenna 103 that comprise correlated downlink transmit antennas 104. As depicted in FIG. 1, the antennas 104 are one of the most commonly used 4-antenna setups for Long Term Evolution (LTE) enhanced Node B (eNB) and will likely also be used in New Radio (NR) low-band systems. The antennas 104 are cross-polarized, i.e., the antennas 104 are either placed with a slant angle of 45° (polarization A) or −45° (polarization B). The first antenna 100 and the third antenna 102 are a first cross-polarized antenna pair, and the second antenna 101 and the fourth antenna 103 are a second cross-polarized antenna pair. The two cross-polarized antenna pairs are closely spaced with $0.5\lambda$ to $1\lambda$ separation. The advantage of such a configuration is that it provides excellent beamforming gain because the antennas 104 comprise correlated and co-polarized antenna pairs. The first antenna 100 and the second antenna 101 are a first co-polarized antenna pair, and the third antenna 102 and the fourth antenna 103 are a second co-polarized antenna pair. Moreover, this particular 4-antenna setup allows reasonable multiplexing gain of up to four layers thanks to a combination of polarization diversity and sufficient spatial diversity.

Beamforming with correlated antennas requires that the phase difference between individual antenna elements is small. Any antenna error that affects phase relations could prevent systems from realizing full beamforming potential. Ideally, to achieve beamforming gain, the antennas 104 shown in FIG. 1 should be calibrated. However, because of cost, most of the 4 transmit antennas setups currently used in LTE eNBs are uncalibrated. When the antennas 104 are uncalibrated, the signal over each antenna has a different phase $\varphi_k$, k=0,1,2,3. When the wireless industry evolves into Fifth Generation (5G), those radio-antenna systems will be reused.

For each pair of correlated co-polarized antenna pairs of FIG. 1, i.e., the first co-polarized antenna pair for polarization A or the second co-polarized antenna pair for polarization B, the main lobe of the radiation pattern or beam during transmission points in the direction where the phases of antenna signals are added constructively. Hence, beam direction depends on the phase difference between two co-polarized antennas such as the first antenna 100 and the second antenna 101 or the third antenna 102 and the fourth antenna 103. When the phase difference between two correlated antennas changes, the beam direction changes, as illustrated by FIG. 2.

The phase difference between antennas in each co-polarized antenna pair can be expressed approximately as:

$$\emptyset_A = \varphi_1 - \varphi_0$$

and $$\emptyset_B = \varphi_3 - \varphi_2.$$

If the antennas are calibrated, i.e., $\varphi_k=0$ for all k=0,1,2,3, then $\emptyset_A=\emptyset_B=0$ and the beams from two polarizations are aligned and point to bore sight, as illustrated by the solid line in FIG. 2.

If the antennas are not calibrated, i.e., $\varphi_k \neq 0$ for all k=0,1,2,3, but the phase differences of two polarizations are the same, i.e., $\emptyset_A=\emptyset_B \neq 0$, the beams from two polarizations are still aligned while beam direction is deviated from bore sight. For example, when $\emptyset_A=\emptyset_B \neq 135°$, the beams of the two polarizations can be illustrated by the dashed line in FIG. 2.

However, when the phase difference from two beams is not equal, i.e., $\emptyset_A \neq \emptyset_B$ the two beams will point to different directions. The example shown in FIG. 1 can be considered such as a case when $\emptyset_A=0°$ and $\emptyset_A=135°$. This misalignment leads to great performance degradation. The phase of signal on antenna k, $\varphi_k$, for subcarrier frequency f, can be modeled as follows:

$$\varphi_k = \varphi_{k0} + 2\pi f \Delta t_k.$$

There are two components in $\varphi_k$: one is a fixed frequency independent phase $\varphi_{k0}$, another is a frequency dependent phase caused by timing delay $\Delta t_k$.

The above-mentioned text takes 4 Tx (transmit) antennas as the example. However, the example can be extended to other antenna configurations, such as 8 Tx and 16 Tx.

In FIG. 3, a related art precoding matrix indicator (PMI)-based antenna calibration algorithm is shown. In PMI-based antenna calibration, the base station (BS) sweeps different beams in different reference signal transmission instances (as shown in step 300), user equipments (UEs) estimate PMI based on the beamformed reference signal (RS) (as shown is step 302) and feed back these PMIs to the BS, and the BS estimates radio delay and phase error based on the PMI feedback, as shown in steps 304 and 306. After radio delay and phase error are estimated, the New Radio base station (gNB) compensates the transmitted signals based on the estimated phase and delay error as shown in step 308 and transmits the compensated signal to NR UEs as shown in step 310.

Assuming the number of transmitted antennas is M and the transmission frequency band is divided into K subbands of frequency span $\Delta f$, where each subband is numbered k where $k \in \{1, \ldots, K\}$ and k=1 represents the frequency band of lowest frequency, then the signal $y_k$ received at a receiving radio device, including the signals from the M transmitting antennas, can be assumed to follow the following expression for a given subband k:

$$y_k = H_k C_k w_k x_k + e_k \qquad (1)$$

3 where the transmission channel matrix $H_k$ is a representation of the transmission channel, $e_k$ represents interference and noise experienced on the transmission channel, $x_k$ is the signal transmitted from the transmitting radio device, and $C_k$ is a diagonal matrix capturing the delays and phase of the M different transmitting antennas, such that $$C_k = \mathrm{diag}\{e^{-j(2\pi\Delta f k\tau_1 + \theta_1)} \ldots e^{-j(2\pi\Delta f k\tau_M + \theta_M)}\} \quad (2)$$

where $\tau_m$ is the time delay associated with the mth transmitting antenna and $\theta_m$ is the phase associated with the mth transmit antenna. The value of the time delay $\tau_m$ of the mth transmission equipment and the phase can be assumed to be the same in all k frequency subbands, and $w_k$ is the precoding matrix.

In NR, for subband PMI feedback, for example, UE decides the preferred matrix $w_k$ based on the following:

$$w_k = \mathrm{argmax}_w(w^H C_k^H H_k^H H_k C_k w) \quad (3)$$

$$\text{Subject to } \|w\|_2 = 1$$

Based on simple mathematical manipulation, the optimal w can be $$w_k = C_k^H u_k \quad (4)$$

where $u_k$ is the eigenvector of $R_k$, wherein $$E(H_k^H H_k) = R_k.$$

When a polarization antenna is used, one can assume $R_k$ is the same for different k and the correlation matrix is the same for different polarization antennas and is set as R, also known as $R = R_k$ for any k. Thus, the $w_k$ can be simplified into the following:

$$w_k = C_k^H u \quad (5)$$

where u is the eigenvector of R. When $w_k$ is obtained, $$C_k^H$$

can be obtained, thus the delay and phase error can be estimated based on the relationship between $$C_k^H,$$

phase and, delay given in Equation (2).

As shown in step 300 of FIG. 3, to enable a UE-aided PMI-based antenna calibration method, different beamforming (phase rotation) shall be used for the RSs, so that UE can provide multiple spatial samples for the channels. There are multiple phase rotation methods for a 4 Tx case in the prior art, for example, using the same rotation for different polarizations or using phase rotation with a fixed offset for different polarizations. Due to NR codebook constraints, using the prior-art phase rotation for 4 Tx leads to the base station failing to estimate the delay and phase error for the uncalibrated antenna. Further, if the PMI-based antenna calibration method is applied for 8 or more transmitted antennas, there is no reference to which to refer for phase rotation. The present disclosure relates to a general optimal scheme to design the phase rotation for the UE-aid PMI-based antenna calibration method.

SUMMARY

Embodiments of the present disclosure provide methods, apparatuses, and computer products for a base station. A method includes retrieving (1100) a plurality of phase rotations associated with a codebook for precoding matrix indicator, PMI, feedback; transmitting (1102), to a User Equipment, UE, (412), a plurality of Channel State Information Reference Signals, CSI-RSs, on a plurality of beams that correspond to the plurality of phase rotations; receiving (1106), from the UE (412), a plurality of PMIs associated with the plurality of CSI-RSs, respectively, wherein the plurality of PMIs are indicative of a plurality of quantized precoding matrices from the codebook; using (1108) the plurality of quantized precoding matrices and the plurality of phase rotations to estimate phase and/or delay errors for a plurality of transmit antenna branches of the base station (402).

Generally, the present disclosure relates to a optimizing scheme to generate the rotations applied on the CSI-RS to enable precoding matrix indicator (PMI)-based antenna calibration. One embodiment uses a detailed iterative scheme. Simulation results show that using the rotation on a CSI-RS, PMI-based antenna calibration according to the present disclosure can achieve good performance.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 is a flowchart showing the basic software-based antenna calibration algorithm.

FIG. 6 is a diagram showing $w_k$ quantization in the original codebook and in the rotation codebook.

FIG. 9 is a flowchart showing the basic steps for the iterative method according to the present disclosure.

FIG. 10 is a diagram of a computer system that performs the steps of the flowchart of FIG. 9.

DETAILED DESCRIPTION

Figure 1:
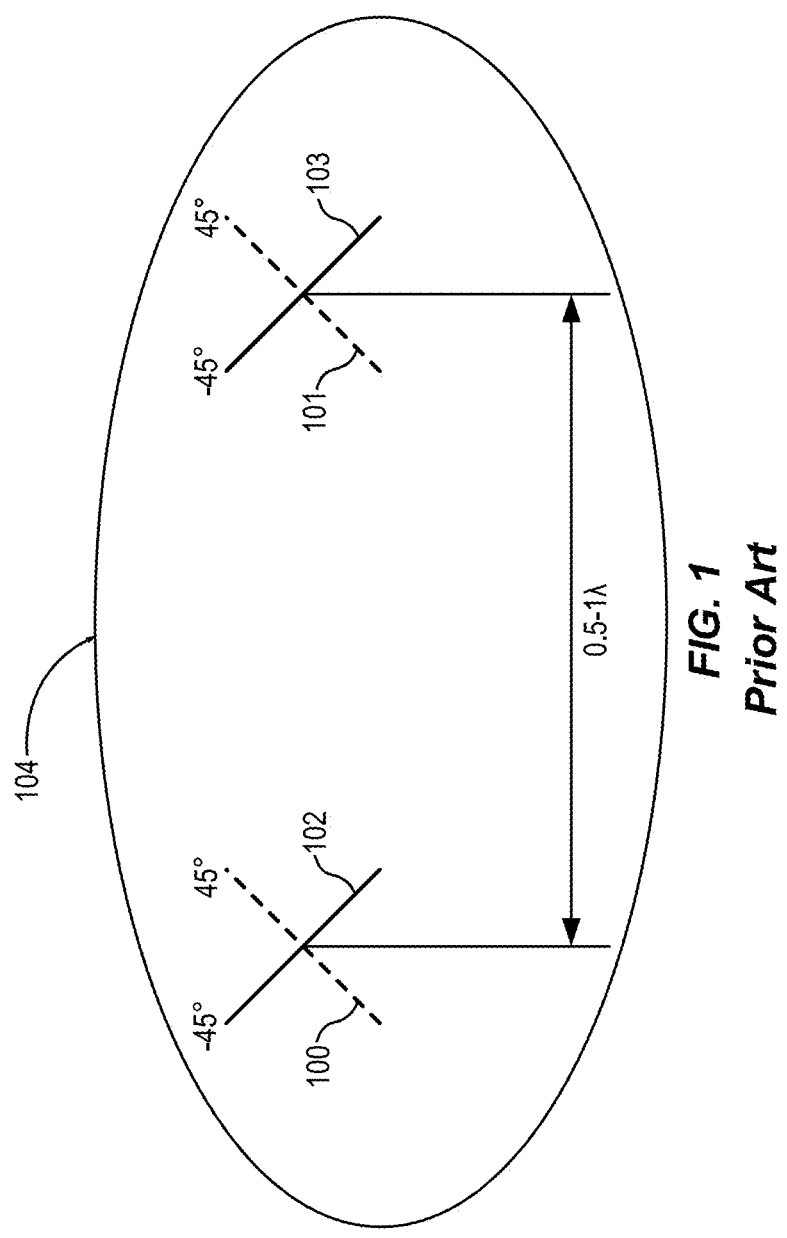
FIG. 1 is a diagram showing 4 correlated downlink transmit antennas.
Figure 2:
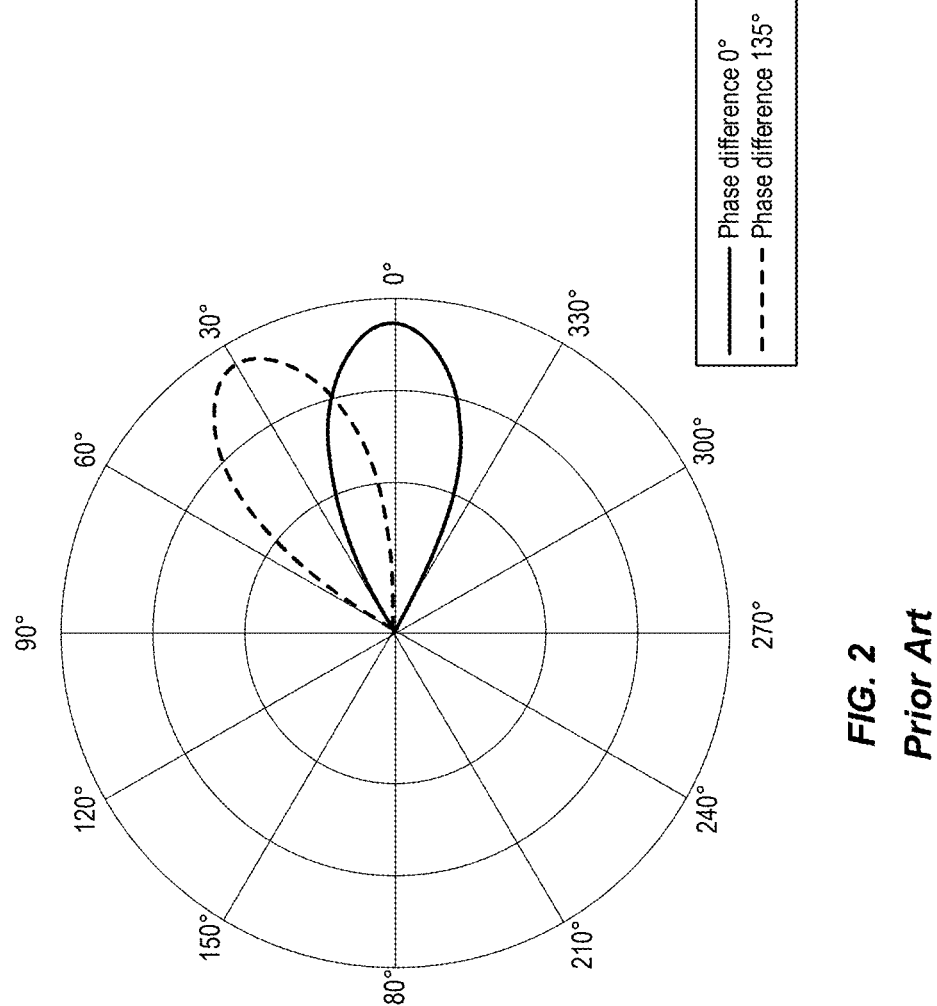
FIG. 2 is a polar radiation plot showing beams pointing to different directions with phase difference changes.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
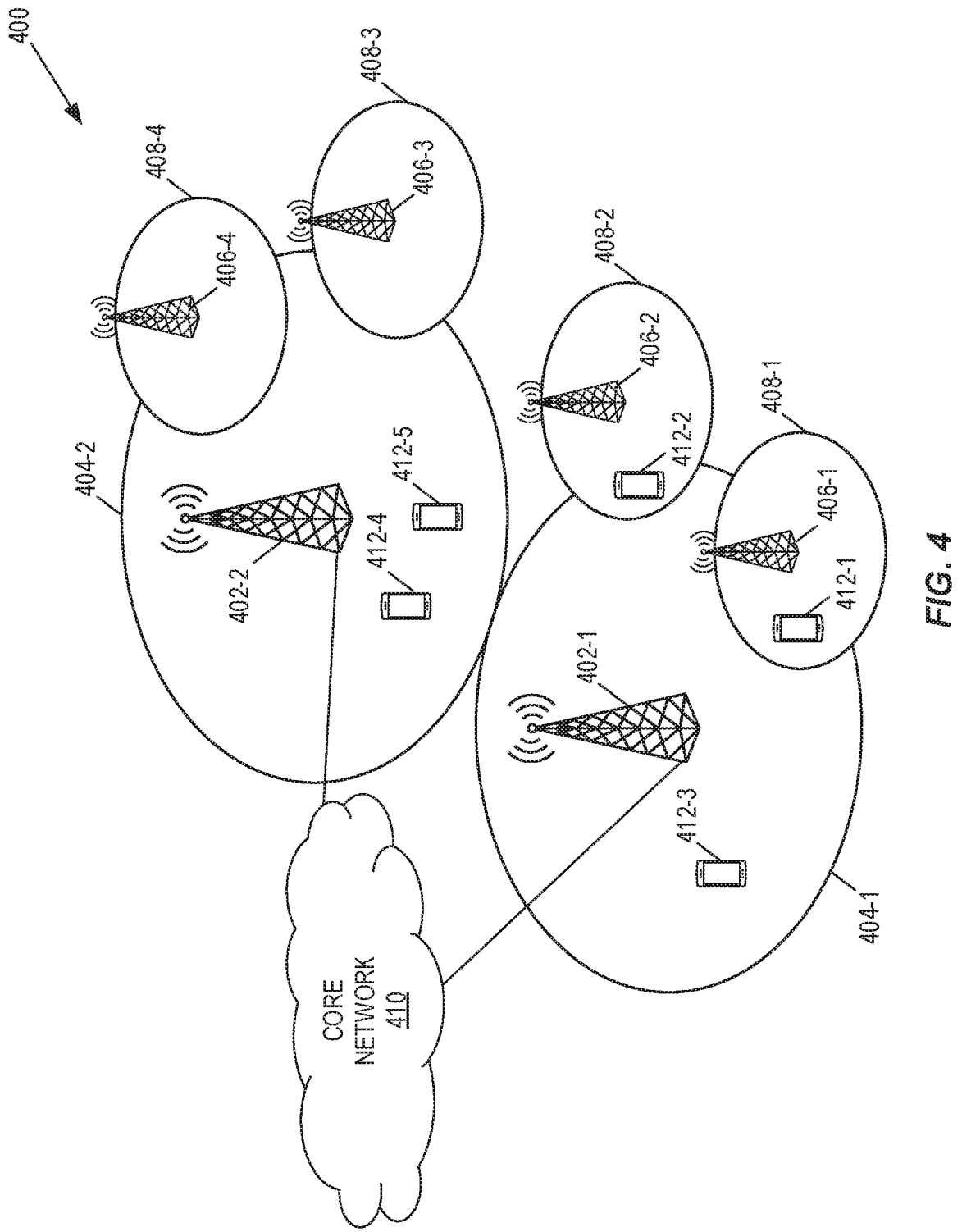
FIG. 4 illustrates one example of a cellular communications system according to some embodiments of the present disclosure.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC) or an Evolved Packet System (EPS) including an Evolved Universal Terrestrial RAN (E-UTRAN) and a Evolved Packet Core (EPC). In this example, the RAN includes base stations 402-1 and 402-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through

406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Based on Equation (5), if $w_k$ can be obtained ideally, $$C_k^H$$

can be obtained and furthermore the delay and the phase error can be obtained. Thus, the antenna can be calibrated. However, in a practical system, such as New Radio (NR) or Long Term Evolution (LTE), the $w_k$ is quantized into codebook. For simplification, the quantized $w_k$ is defined as $\tilde{w}_k$. Thus, based on quantized feedback $\tilde{w}_k$, New Radio base station (gNB) cannot achieve accurate delay and phase estimation. One way to increase quantized accuracy is by rotating the channel state information reference signals (CSI-RSs) with different beamforming, as shown in step 300 in FIG. 3. Assuming that user equipment (UE) preferred precoding is given by $v_i$, where $v_i$ is the ith vector of the codebook, and CSI-RS phase rotation is $\Omega$, the received signal on CSI-RS can be described as follows:

$$y_k = H_k C_k \Omega v_i x_k + e_k \qquad (6)$$

Thus, based on Equations (1) and (6), $\tilde{w}_k = \Omega v_i$.

Figure 5:
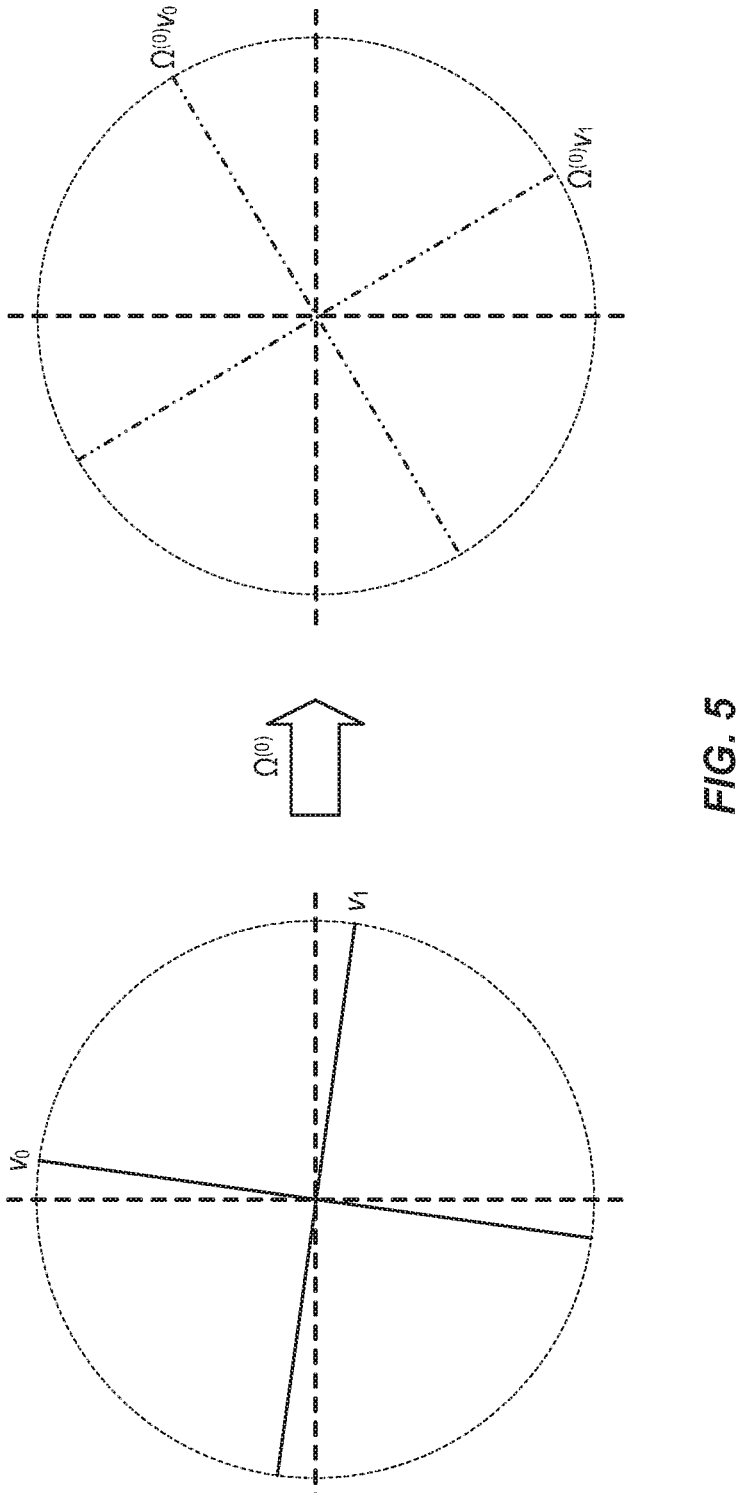
FIG. 5 is a concept illustration showing the quantization effect on $v_i$ with rotating channel state information reference signals (CSI-RSs) with different beamforming.

The CSI-RS phase rotating effect on $v_i$ is shown in FIG. 5. As shown in FIG. 5, the left figure shows the original codebook $v_0, v_1, \ldots, v_{L-1}$, where L is the codebook size, and the right figure shows the codebook after performing $\Omega^{(n)}$ rotation on the original codebook. Assuming $w_k$, in FIG. 6 the left figure shows the relationship between $w_k$ and the original codebook, and the right figure shows the relationship between $w_k$ and the rotated codebook. The original codebook, $w_k$ is quantized into $v_1$ since $w_k$ is close to $v_1$, and the rotated codebook, $w_k$ is quantized into $\Omega^{(0)}v_0$. The maximum quantization error is 45 degrees if only the original codebook or only the rotated codebook are used to quantize the 2-dimensional space in this example. However, if the original codebook is used at the first time slot and then the rotated codebook is used in the second time slot, in the first time slot, $w_k$ is quantized into $v_1$, and in the second time slot, $w_k$ is quantized into $\Omega^{(0)}v_0$.

Figure 8:
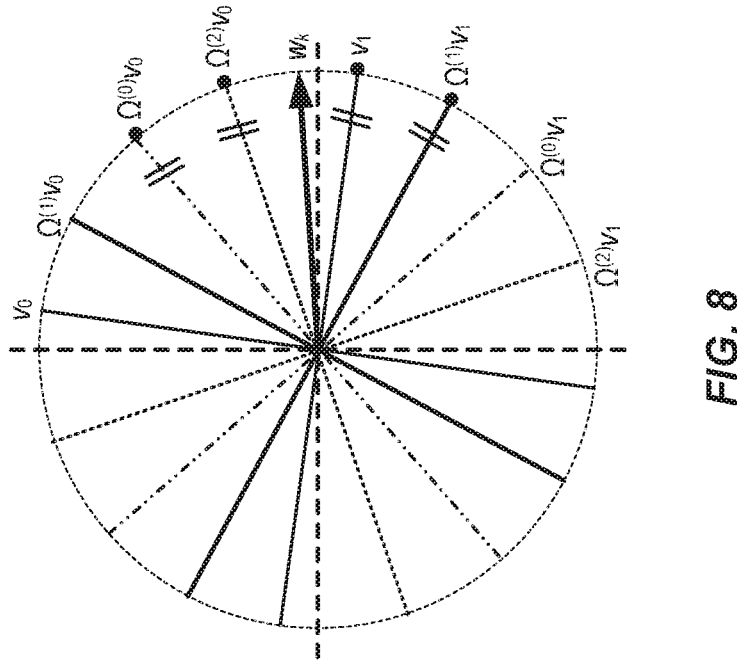
FIG. 8 is a diagram showing $w_k$ quantization error with a combination of the original codebook and multiple rotated codebooks.
Figure 7:
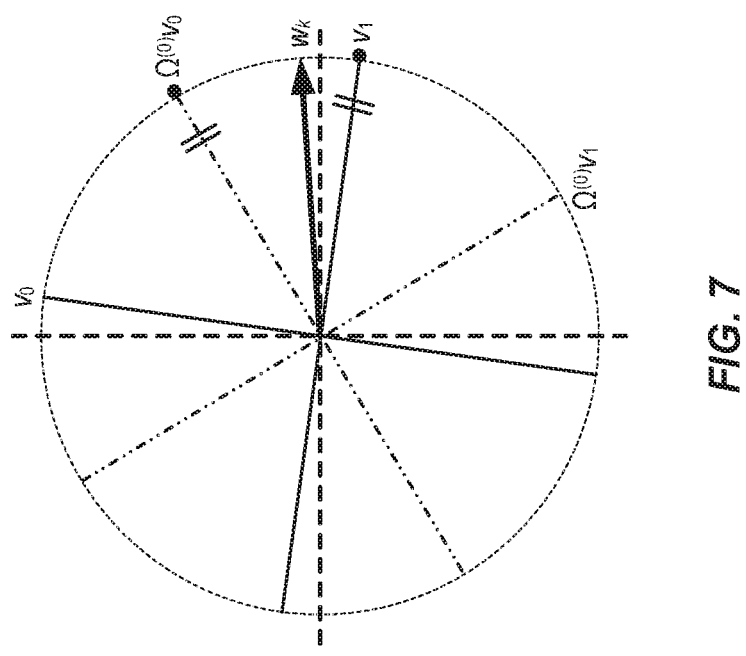
FIG. 7 is a diagram showing $w_k$ quantization error with a combination of the original codebook and one rotated codebook.

As shown in FIG. 7, the maximum quantization error of $w_k$ becomes 22.5 degrees if the original codebook and quantized codebook are used for different time slots. As an example, the case in which multiple rotations are used is shown in FIG. 8. In FIG. 8, phase rotation on CSI-RS is I (identity matrix), $\Omega^{(0)}$, $\Omega^{(1)}$, $\Omega^{(2)}$ sequentially, $w_k$ is quantized into $v_1$, $\Omega^{(0)}v_0$, $\Omega^{(2)}v_0$, $\Omega^{(1)}v_1$ sequentially. The average value of $v_1$, $\Omega^{(0)}v_0$, $\Omega^{(2)}v_0$, $\Omega^{(1)}v_1$ is expected to be $w_k$. The maximum error is expected to be associated with the minimum chord distance between any of $v_1$, $\Omega^{(0)}v_0$, $\Omega^{(2)}v_0$, and $\Omega^{(1)}v_1$.

Assuming that the initial codebook is $\mathbb{C}^{(0)}$, the codebook set is transformed into $\Omega^{(0)}\mathbb{C}^{(0)}$, $\Omega^{(1)}\mathbb{C}^{(0)}$, . . . , $\Omega^{(N-1)}\mathbb{C}^{(0)}$ after applying rotation $\Omega^{(0)}$, . . . , $\Omega^{(N-1)}$ on the CSI-RS, and intuitively, one of the best solutions to $\Omega^{(0)}$, . . . , $\Omega^{(N-1)}$ is to let the concatenated codebook $\{\Omega^{(0)}\mathbb{C}^{(0)}$, $\Omega^{(1)}\mathbb{C}^{(0)}$, . . . , $\Omega^{(N-1)}\mathbb{C}^{(0)}\}$ uniformly distribute in the spatial space as shown in FIG. 8 so that the minimum distance between any vectors is maximum. According to this principle, in one embodiment, an iterative method obtains $\Omega^{(n)}$ (n=0, . . . , N−1).

FIG. 9 is a flowchart showing the basic steps for the iterative method according to the present disclosure. The method first comprises generating (900) a first rotation matrix $\Theta^{(k)}$ based on a first codebook set $\mathbb{C}_k$ having first elements. The method further comprises generating (902) a second codebook set $\Theta^{(k)}\mathbb{C}_k$ having second elements by applying the rotation matrix $\Theta^{(k)}$ to the first codebook set $\mathbb{C}_k$, wherein a minimum distance between the first elements and the second elements is maximized. In some embodiments, the method further includes generating (904) a third codebook set $\mathbb{C}_{k+1}$ having third elements by concatenating the first elements with the second elements. This is followed by generating (906) a second rotation matrix $\Theta^{(k+1)}$ based on the third codebook set $\mathbb{C}_{k+1}$ having third elements, and generating (908) a fourth codebook set $\Theta^{(k+1)}\mathbb{C}_{k+1}$ having fourth elements by applying the second rotation matrix $\Theta^{(k+1)}$ to the third codebook set $\mathbb{C}_{k+1}$. A minimum distance between the third elements and the fourth elements is maximized. Yet another step involves deriving (910) rotation matrices $\Omega$ based on the first rotation matrix $\Theta^{(k)}$ and the second rotation matrix.

Detailed sub-steps for the basic procedure of FIG. 9 are as follows.

Initialization

Set k=0.

Initialize the codebook set $\mathbb{C}$ into $\mathbb{c}^0$, also known as $\mathbb{C}_k = \{ \mathbb{c}^0 \}$, wherein $\mathbb{c}^0$ denotes the original codebook set used by UE for channel PMI feedback.

Initialize the rotation set $\Omega_k = [I]$, where I is the identity matrix and the dimension of I is the same as the configured number of CSI-RS ports.

Give the maximum number of iterations K.

Step 1: Find $\Theta^{(k)}$ where $\Theta^{(k)}$ is given by the following:

$$\Theta^{(k)} = \arg\left(\max_{\Theta^{(k)}} \min_{w^{(0)}, w^{(1)}} d(w_0, w_1)\right) \text{ for } \forall w^{(0)} \in \mathbb{C}_k,$$
$$\forall w^{(1)} \in \Theta^{(k)}\mathbb{C}_k$$

$\Theta^{(k)}\mathbb{C}_k$ denotes as the applying $\Theta^{(k)}$ to the codebook set $\mathbb{C}_k$, where $d(w^{(0)}, w^{(1)})$ can be defined in a number of different distances. As one example, the $d(w^{(0)}, w^{(1)})$ can be defined as distance. The distance between $w^{(0)}$ and $w^{(1)}$ can be defined as $$d(w^{(0)}, w^{(1)}) = \frac{1}{\sqrt{2}} \left\| w^{(0)}(w^{(0)})^H - w^{(1)}(w^{(1)})^H \right\|_F$$

where $\|\cdot\|_F$ denotes the matrix Frobenius norm. As another example, the $d(w^{(0)}, w^{(1)})$ can be defined as the projection two-norm distance. The projection two-norm distance is given by $$d\left(w^{(0)}, w^{(1)}\right) = \left\|w^{(0)}\left(w^{(0)}\right)^H - w^{(1)}\left(w^{(1)}\right)^H\right\|_2$$

where $\|\cdot\|_2$ denotes the matrix two-norm. As another example, the $d(w^{(0)}, w^{(1)})$ can be defined as the Fubini-Study distance. The Fubini-Study distance can be give by $$d\left(w^{(0)}, w^{(1)}\right) = \arccos\left|\det\left(\left(w^{(0)}\right)^H w^{(1)}\right)\right|$$

where $\det(\cdot)$ denotes the determinant of a matrix.

Step 2: Update $\mathbb{C}_{k+1}$, $\Omega_{k+1}$.

Step 2.1: $\mathbb{C}_{k+1} = \{\mathbb{C}_k, \Theta^{(k)}\mathbb{C}_k\}$, wherein $\{\mathbb{C}_k, \Theta^{(k)}\mathbb{C}_k\}$ is concatenating the codebook set $\mathbb{C}_k$ and $\Theta^{(k)}\mathbb{C}_k$ together to form a new codebook set set to $\mathbb{C}_{k+1}$.

Step 2.2: $\Omega_{k+1} = [\Omega_k, \Theta^{(k)}\Omega_k]$, wherein $[\Omega_k, \Theta^{(k)}\Omega_k]$ is concatenating the matrix $\Omega_k$ and $\Theta^{(k)}\Omega_k$ together to form a new matrix and set to $\Omega_{k+1}$.

Step 3: $k=k+1$

Go back to step 1 if $k<K$; otherwise, stop.

As a result, $\Omega = \Omega_K = [\Omega^{(0)}, \Omega^{(1)}, \ldots, \Omega^{(N-1)}]$. More specifically, the rotation $\Omega^{(n)}$ on CSI-RS can be given as follows:

$$\Omega^{(0)} = I$$
$$\Omega^{(1)} = \Theta^{(0)}I$$
$$\Omega^{(2)} = \Theta^{(1)}I$$
$$\Omega^{(3)} = \Theta^{(1)}\Theta^{(0)}I$$
$$\Omega^{(4)} = \Theta^{(2)}I$$
$$\Omega^{(5)} = \Theta^{(2)}\Theta^{(0)}I$$
$$\Omega^{(6)} = \Theta^{(2)}\Theta^{(1)}I$$
$$\Omega^{(7)} = \Theta^{(2)}\Theta^{(1)}\Theta^{(0)}I$$
$$\ldots$$

In another embodiment, to simplify the search of $\Omega^{(n)}$ ($n=0, \ldots, N-1$) and to guarantee the constant amplitude from different antennas, $\Theta^{(k)}$ ($k=0, \ldots, K-1$) can be constructed as $$\Theta^{(n)} = \mathrm{diag}\left(1, e^{j\phi_1^{(k)}}, \ldots, e^{j\phi_M^{(k)}}\right)$$

where diag (X) is a diagonal matrix and X is put on the main diagonal.

For a NR 4-port codebook, one example for the $\Theta^{(k)}$ ($k=0, \ldots, K-1$) can be given by the following:)

$$\Theta^{(0)} = \mathrm{diag}(1 \quad 0.3827 - 0.9239i \quad 0.7071 - 0.7071i \quad 0.3827 + 0.9239i)$$

$$\Theta^{(1)} = \mathrm{diag}(1 \quad 0.9723 - 0.2339i \quad 0.5221 - 0.8529i \quad 0.7071 + 0.7071i)$$

-continued $$\Theta^{(2)} = \mathrm{diag}(1 \quad 0.7071 - 0.7071i \quad 0.2938 - 0.9559i \quad 0.4681 + 0.8837i)$$

$$\Theta^{(3)} = \mathrm{diag}(1 \quad 0.6802 + 0.7330i - 0.3479 - 0.9375i \quad 0.9239 - 0.3827i)$$

$$\Theta^{(4)} = \mathrm{diag}(1 \quad 0.4153 - 0.9097i \quad 0.4008 - 0.9162i \quad 0.6670 + 0.7451i)$$

$$\Theta^{(5)} = \mathrm{diag}(1 \quad 0.6453 - 0.7639i \quad 0.6930 - 0.7209i \quad 0.4149 + 0.9099i)$$

And $\Omega$ can be given by the following:

$$\Omega = \left\{\Omega^{(0)}, \Omega^{(1)}, \ldots, \Omega^{(63)}\right\} =$$
$$\left\{I, \Theta^{(0)}, \Theta^{(1)}, \Theta^{(1)}\Theta^{(0)}, \ldots, \Theta^{(0)}\Theta^{(1)}\Theta^{(2)}\Theta^{(3)}\Theta^{(4)}\Theta^{(5)}\right\}.$$

FIG. 10 is a diagram of a computer system (1000) that performs the steps of the flowchart of FIG. 9. The computer system (1000) includes a network interface 1002 for communicating with external devices (not shown), and a processor circuit 1004 configured to execute computer readable code 1006 that is stored in a memory circuit 1008. In some embodiments, a computer program in the form of the computer readable code 1006 includes instructions which, when executed by the processor circuit 1004, causes the processor circuit 1004 to carry out the steps of the flowchart of FIG. 9. In some embodiments, a carrier comprising the aforementioned computer program product is provided. The carrier is one of an electronic signal, an optical signal, a radio signal, or a computer readable storage medium (e.g., a non-transitory computer readable medium such as the memory circuit 1008).

Figure 11:
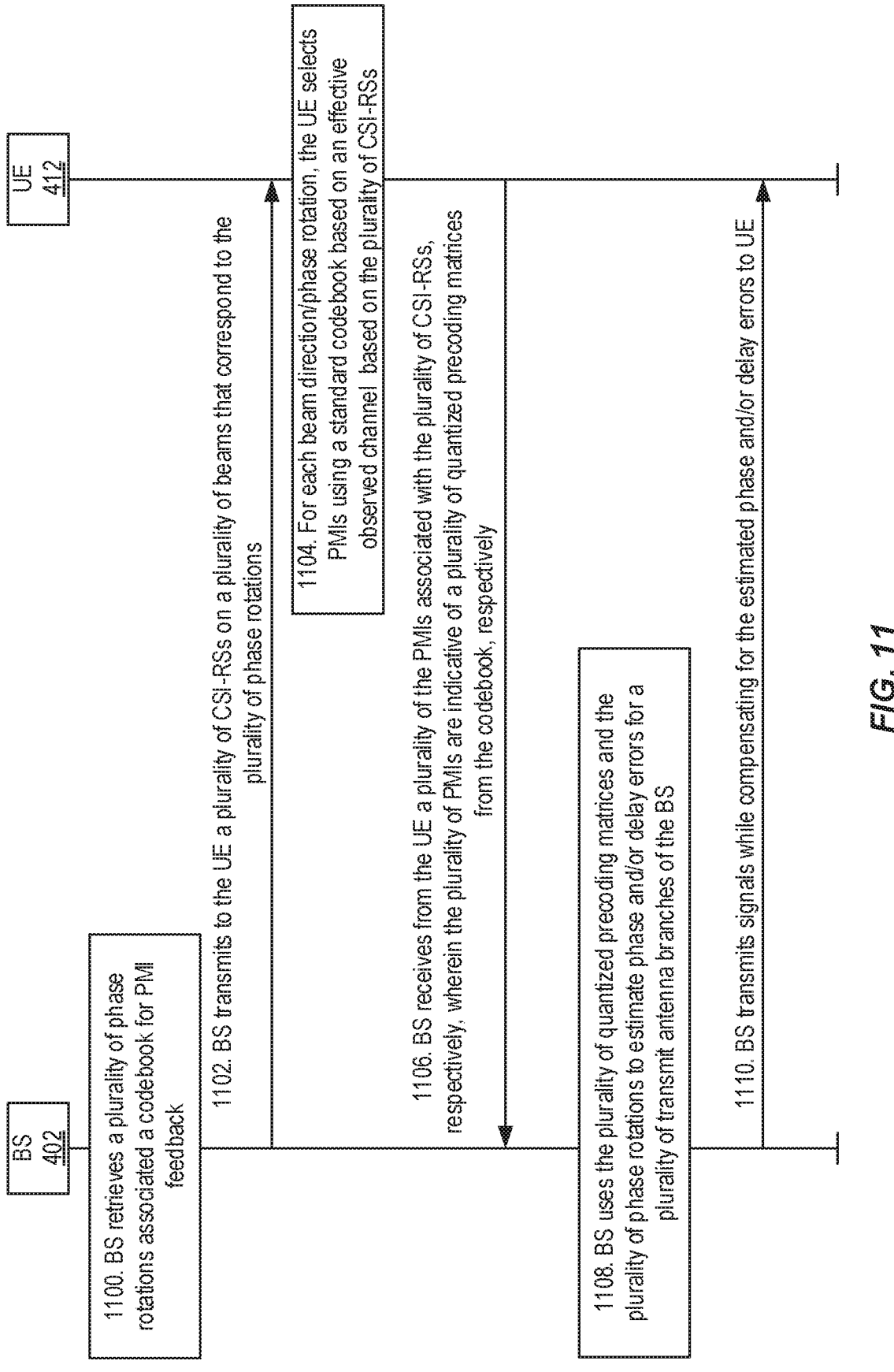
FIG. 11 is a flowchart showing a software-based antenna calibration algorithm.

FIG. 11 is a flowchart showing an antenna calibration procedure in accordance with the present disclosure. The base station (402) retrieves (1100) a plurality of phase rotations associated with a codebook for precoding matrix indicator, PMI, feedback. The base station (402) then transmits (1102) to the UE (412) a plurality of Channel State Information Reference Signals, CSI-RSs, on a plurality of beams that correspond to the plurality of phase rotations. For each beam direction/phase rotation, the UE (412) selects PMIs using a standard codebook based on an effective channel based on the plurality of CSI-RSs (step 1104). The base station (402) then receives (1106), from the UE (412), a plurality of PMIs associated with the plurality of CSI-RSs, respectively, wherein the plurality of PMIs are indicative of a plurality of quantized precoding matrices from the codebook. The base station (402) then uses (1108) the plurality of quantized precoding matrices and the plurality of phase rotations to estimate phase and/or delay errors for a plurality of transmit antenna branches of the base station (402). The base station can then transmit (1110) signals to UE(s) (412) while compensating for the estimated phase and/or delay errors.

Figure 12:
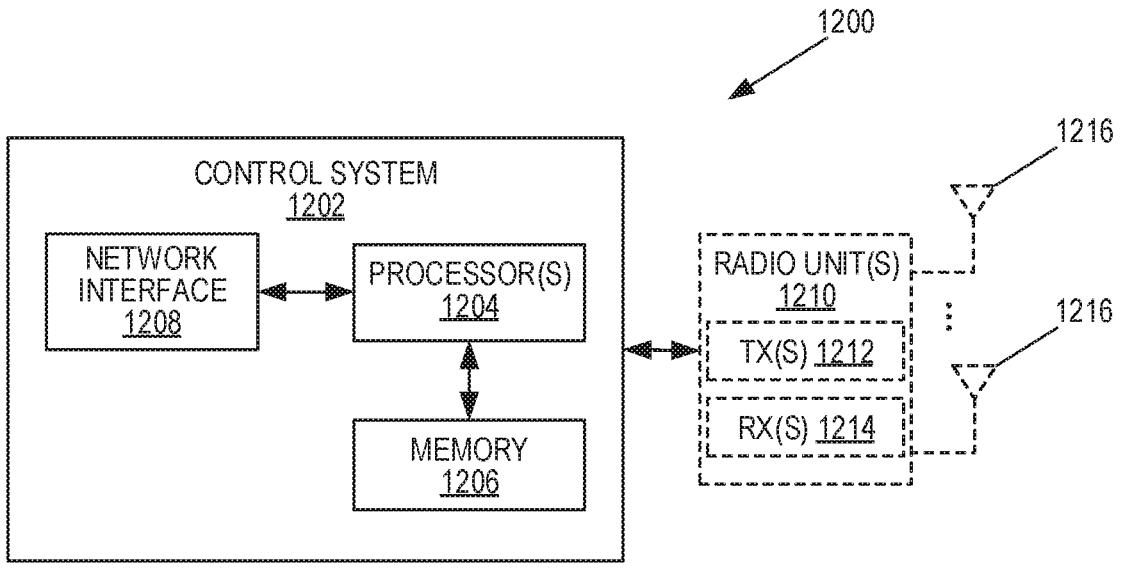
FIG. 12 is a schematic block diagram of a radio access node according to some embodiments of the present disclosure.

FIG. 12 is a schematic block diagram of a radio access node 1200 according to some embodiments of the present disclosure. Optional features are represented by dashed boxes. The radio access node 1200 may be, for example, a base station 402 or 406 or a network node that implements all or part of the functionality of the base station 402 or gNB described herein. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 may include one or more radio units 1210 that each includes one or more transmitters 1212 (TX) and one or more receivers 1214 (RX) coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) are implemented in software that is stored, e.g., in the memory 1206 and executed by the one or more processors 1204.

Figure 13:
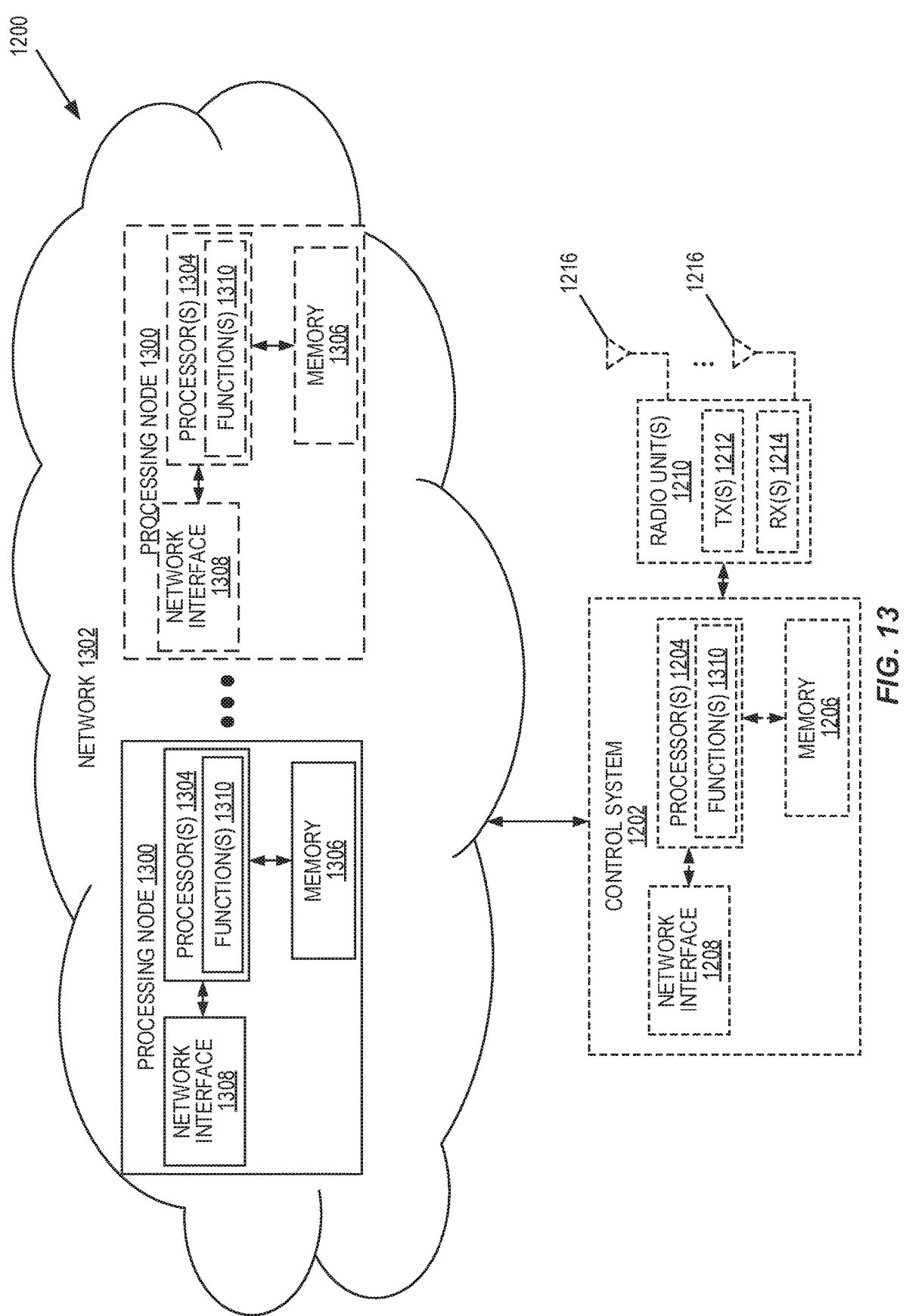
FIG. 13 is a schematic block diagram that illustrates a virtualized embodiment of the radio access node of FIG. 12 according to some embodiments of the present disclosure.

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 may include the control system 1202 and/or the one or more radio units 1210, as described above. The control system 1202 may be connected to the radio unit(s) 1210 via, for example, an optical cable or the like. The radio access node 1200 includes one or more processing nodes 1300 coupled to or included as part of a network(s) 1302. If present, the control system 1202 or the radio unit(s) are connected to the processing node(s) 1300 via the network 1302. Each processing node 1300 includes one or more processors 1304 (e.g., CPUs, ASICs, FPGAs, and/or the like), memory 1306, and a network interface 1308.

In this example, functions 1310 of the radio access node 1200 described herein are implemented at the one or more processing nodes 1300 or distributed across the one or more processing nodes 1300 and the control system 1202 and/or the radio unit(s) 1210 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
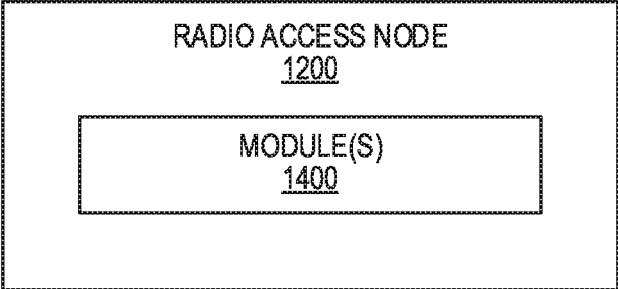
FIG. 14 is a schematic block diagram of the radio access node of FIG. 12 according to some other embodiments of the present disclosure.

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
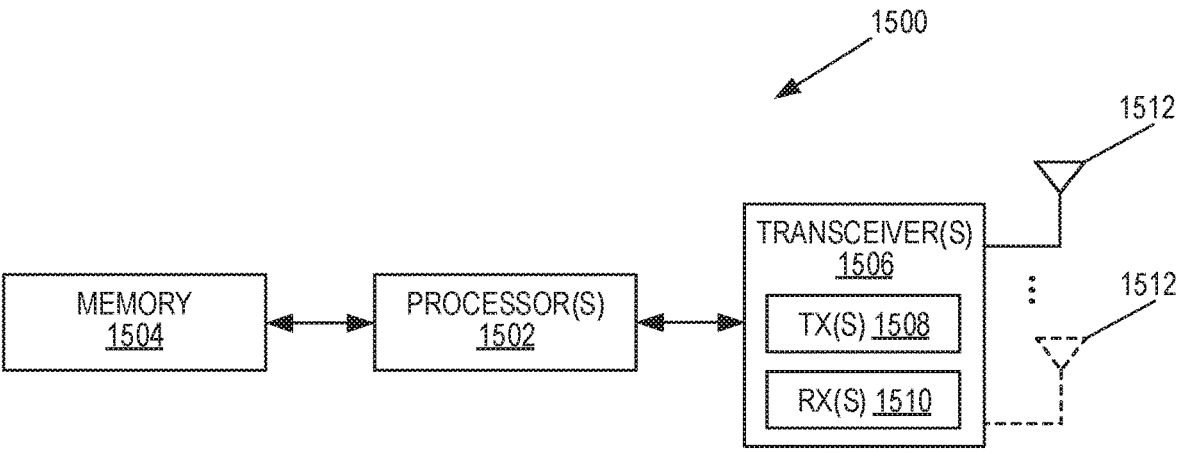
FIG. 15 is a schematic block diagram of a User Equipment device (UE) according to some embodiments of the present disclosure.

FIG. 15 is a schematic block diagram of a wireless communication device 1500 according to some embodiments of the present disclosure. As illustrated, the wireless communication device 1500 includes one or more processors 1502 (e.g., CPUs, ASICs, FPGAs, and/or the like), memory 1504, and one or more transceivers 1506, each including one or more transmitters 1508 and one or more receivers 1510 coupled to one or more antennas 1512. The transceiver(s) 1506 includes radio front-end circuitry connected to the antenna(s) 1512 that is configured to condition signals communicated between the antenna(s) 1512 and the processor(s) 1502, as will be appreciated by one of ordinary skill in the art. The processors 1502 are also referred to herein as processing circuitry. The transceivers 1506 are also referred to herein as radio circuitry. In some embodiments, the functionality of the wireless communication device 1500 described above may be fully or partially implemented in software that is, e.g., stored in the memory 1504 and executed by the processor(s) 1502. Note that the wireless communication device 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the wireless communication device 1500 and/or allowing output of information from the wireless communication device 1500), a power supply (e.g., a battery and associated power circuitry), etc.

In some embodiments, a computer program including instructions which, when executed by at least one processor, causes the at least one processor to carry out the functionality of the wireless communication device 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
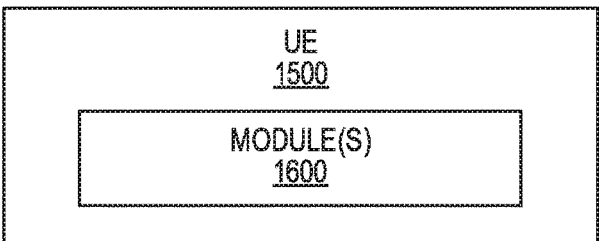
FIG. 16 is a schematic block diagram of the UE of FIG. 15 according to some other embodiments of the present disclosure.

FIG. 16 is a schematic block diagram of the wireless communication device 1500 according to some other embodiments of the present disclosure. The wireless communication device 1500 includes one or more modules 1600, each of which is implemented in software. The module(s) 1600 provide the functionality of the wireless communication device 1500 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessors or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Function
ASIC Application Specific Integrated Circuit
AUSF Authentication Server Function
BS Base Station
CPU Central Processing Unit
CQI Channel Quality Indicator
CSI-RS Channel State Information Reference Signal
DSP Digital Signal Processor
eNB Enhanced or Evolved Node B
EPC Evolved Packet Core
EPS Evolved Packet System
E-UTRAN Evolved Universal Terrestrial Radio Access Network
FPGA Field Programmable Gate Array
gNB New Radio Base Station
gNB-DU New Radio Base Station Distributed Unit
HSS Home Subscriber Server
IoT Internet of Things
LTE Long Term Evolution
MME Mobility Management Entity
MTC Machine Type Communication
NEF Network Exposure Function
NF Network Function
ng-eNB Next Generation Enhanced Node B
NG-RAN Next Generation Radio Access Network
NR New Radio
NRF Network Function Repository Function
NSSF Network Slice Selection Function
PC Personal Computer
PCF Policy Control Function
P-GW Packet Data Network Gateway
PMI Precoding Matrix Indicator
RAM Random Access Memory
RAN Radio Access Network
RI Rank Indicator
ROM Read Only Memory
RRH Remote Radio Head
RS Reference Signal

14

SCEF Service Capability Exposure Function
SMF Session Management Function
Tx Transmit
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method implemented in a base station for a cellular communications system, the method comprising:

retrieving a plurality of phase rotations associated with a codebook for precoding matrix indicator, PMI, feedback;

transmitting, to a User Equipment, UE, a plurality of Channel State Information Reference Signals, CSI-RSs, on a plurality of beams that correspond to the plurality of phase rotations;

receiving, from the UE, a plurality of precoding matrix indicators (PMIs) associated with the plurality of CSI-RSs, respectively, wherein the plurality of PMIs are indicative of a plurality of quantized precoding matrices from the codebook; and combining the plurality of quantized precoding matrices based on the plurality of phase rotations to compute an estimated precoding matrix as:

where:

$W_k$ is the estimated precoding matrix for a k-th subband in which the plurality of CSI-RSs are transmitted;

$W'_{k,nr}$ is a quantized precoding matrix indicated by a PMI received for a non-rotated CSI-RS;

$w'_{k,i}$ for i=0 to N−1 are the plurality of quantized precoding matrices indicated by the received PMIs, where N is the number of CSI-RSs in the plurality CSI-RSs; and $\Omega^{(i)}$ for i=0 to N−1 are the plurality of phase rotations; and the estimated precoding matrix is used for estimating at least one of phase errors or delay errors for a plurality of transmit antenna branches of the base station.

2. The method of claim 1 further comprising transmitting signals from the base station to the UE while compensating for the estimated at least one of the phase errors or the delay errors.

3. The method of claim 1 wherein the plurality of phase rotations are a function of the codebook.

4. The method of claim 3 wherein the codebook comprises a plurality of matrices each corresponding to a different set of precoding weights, and the plurality of phase rotations are such that, for any two phase rotations $\Omega^{(i)}$ and $\Omega^{(j)}$ from among the plurality of phase rotations and any two matrices $w_k$ and $w_l$ from among the plurality of matrices comprised in the codebook, a minimum distance between a respective first phase rotated vector $\Omega^{(i)}W_k$ and a respective second phase rotated vector $\Omega^{(j)}w_l$ is maximized.

5. A base station for a cellular communications system, the base station comprising processing circuitry configured to cause the base station to:

retrieve a plurality of phase rotations associated with a codebook for precoding matrix indicator, PMI, feedback;

transmit, to a User Equipment, UE, a plurality of Channel State Information Reference Signals, CSI-RSs, on a plurality of beams that correspond to the plurality of phase rotations;

receive, from the UE, a plurality of precoding matrix indicators (PMIs) associated with the plurality of CSI- RSs, respectively, wherein the plurality of PMIs are indicative of a plurality of quantized precoding matrices from the codebook; and combine the plurality of quantized precoding matrices based on the plurality of phase rotations to compute an estimated precoding matrix as:

where:

$W_k$ is the estimated precoding matrix for a k-th subband in which the plurality of CSI-RSs are transmitted;

$w'_{k,nr}$ is a quantized precoding matrix indicated by a PMI received for a non-rotated CSI-RS;

$w'_{k,i}$ for i=0 to N−1 are the plurality of quantized precoding matrices indicated by the received PMIs, where N is the number of CSI-RSs in the plurality CSI-RSs; and $\Omega^{(i)}$ for i=0 to N−1 are the plurality of phase rotations; and the estimated precoding matrix is used for estimating at least one of phase errors or delay errors for a plurality of transmit antenna branches of the base station.

* * * * *